United States Patent

Spiegemacher

[11] Patent Number: 5,941,469
[45] Date of Patent: Aug. 24, 1999

[54] CHOPPER KNIFE

[75] Inventor: Kurt Spiegemacher, Kaiserlslautern, Germany

[73] Assignee: Deere & Company, One John Deere Place Moline, Ill.

[21] Appl. No.: 09/134,889

[22] Filed: Aug. 14, 1998

[30] Foreign Application Priority Data

Sep. 27, 1997 [DE] Germany .................. 197 42 770

[51] Int. Cl.[6] .................. B02C 18/06; B02C 18/16
[52] U.S. Cl. .................. 241/291; 241/293; 241/294
[58] Field of Search .................. 241/294, 291, 241/293, 300, 605, 242; 83/349

[56] References Cited

U.S. PATENT DOCUMENTS

| | | | |
|---|---|---|---|
| 2,956,602 | 10/1960 | Gronberg | 146/123 |
| 3,214,106 | 10/1965 | Gorman | 241/294 X |
| 3,584,668 | 6/1971 | Neville | 146/118 |
| 4,061,284 | 12/1977 | Raisbeck et al. | 241/294 |
| 4,257,566 | 3/1981 | Lawrence | 241/221 |
| 4,368,764 | 1/1983 | Peterson et al. | 241/294 X |
| 4,897,897 | 2/1990 | Staheli | 241/294 X |
| 5,779,167 | 7/1998 | Wagstaff | 241/242 |

FOREIGN PATENT DOCUMENTS

| | | |
|---|---|---|
| 204 832 | 8/1959 | Austria . |
| 34 39 798 | 8/1985 | Germany . |
| 35 37 092 | 4/1987 | Germany . |
| 1 559 322 | 1/1980 | United Kingdom . |

*Primary Examiner*—John M. Husar

[57] ABSTRACT

A forage harvester chopper knife includes a cutting region defined by a plurality of recesses arranged across the width of the knife so as to result in a corrugated or serrated cutting edge, the cutting edge thus defined requiring less energy for cutting crop passing over a cutter bar.

5 Claims, 3 Drawing Sheets

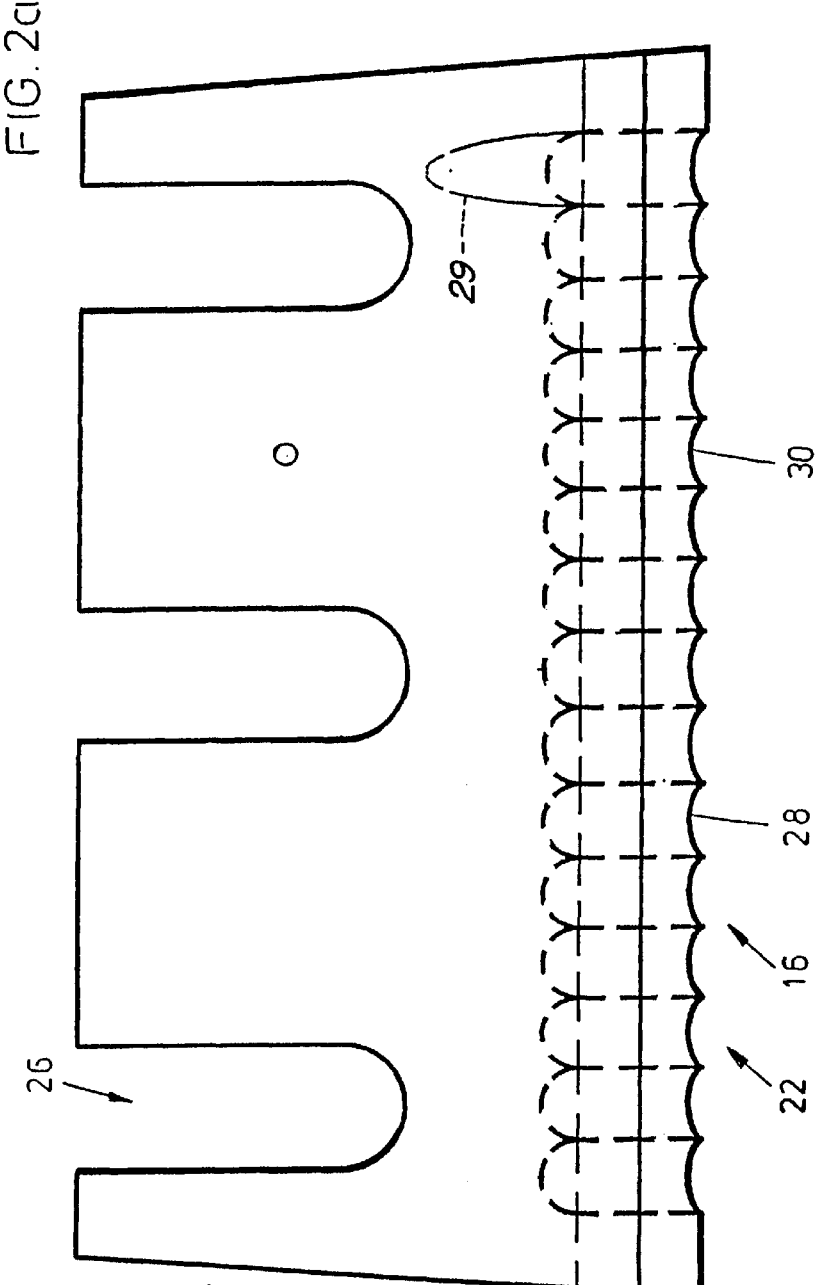
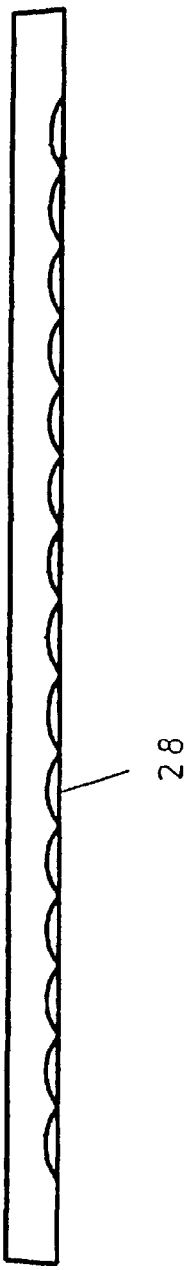
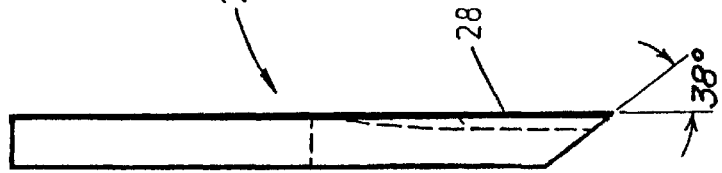

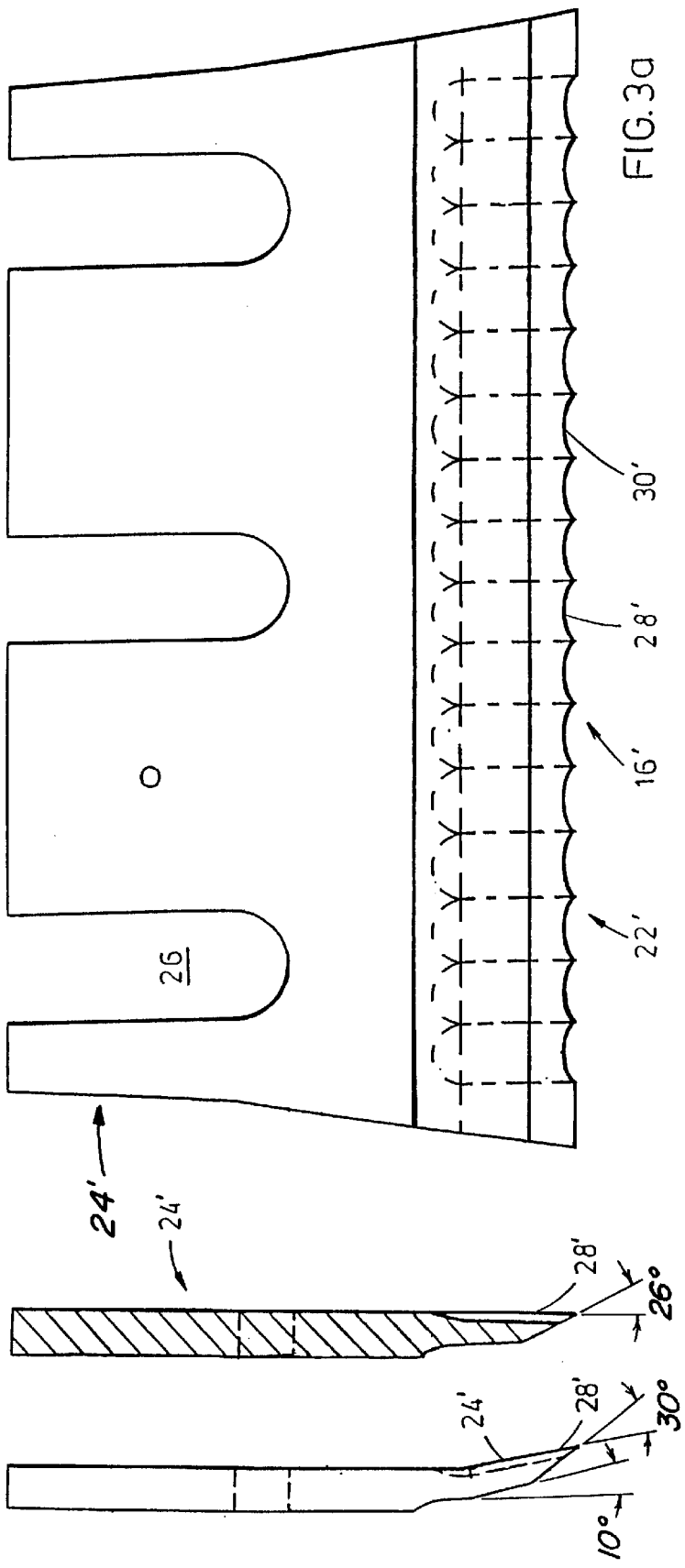

5,941,469

1

CHOPPER KNIFE

BACKGROUND OF THE INVENTION

The invention concerns a chopper knife for a forage harvester, the knife including a cutting region including a leading side terminating at an outer cutting edge. U.S. Pat. No. 4,061,284, granted Dec.6, 1977, to Raisbeck et al. and U.S. Pat. No. 4,257,566, granted Mar. 24, 1981, to Lawrence, each disclose a chopper drum having a plurality of knife supports arranged in rows, each of which carries a generally plate-shaped chopper knife. Each of these chopper knives has a leading cutting region, while the rear region of the knife is used for fastening it to the knife support, for which purpose elongated slots and screws are provided. Sharpening of the cutting edges of the chopper knives of this chopper drum are ground, in that a grinding stone is guided over the cutting region while the chopper drum is rotating.

The problem with the known chopper knives is that undue power is required for their operation.

SUMMARY OF THE INVENTION

According to the present invention there is provided an improved forage harvester chopper knife.

A broad object of the invention is to provide a chopper knife which requires less power to operate than known chopper knives.

A more specific object of the invention is to provide a chopper knife which has a serrated cutting edge which results in less power being needed to operate a chopper drum equipped with such knives.

These and other objects of the invention will become apparent from a reading of the ensuing description together with the appended drawings.

BRIEF DESCRIPTION OF THE DRAWINGS

FIG. 2a is a plan view of the chopper knife with recesses on the leading side of the cutting region of a planar knife.

FIG. 2b is a side view of the chopper knife of FIG. 2a.

FIG. 2c is a front view of the chopper knife of FIG. 2a.

FIG. 3a is a chopper knife with recesses on the planar rear or trailing mounting region of a knife having a front or leading cutting region bent at an angle to the mounting region of the knife.

FIG. 3b is a side view of the chopper knife of FIG. 3a prior to bending the cutting region relative to the remainder of the knife.

FIG. 3c is a side view of the chopper knife after bending the cutting region relative to the remainder of the knife.

FIG. 3d is a front view of the chopper knife of FIG. 3a.

DESCRIPTION OF THE PREFERRED EMBODIMENT

Figure 1:
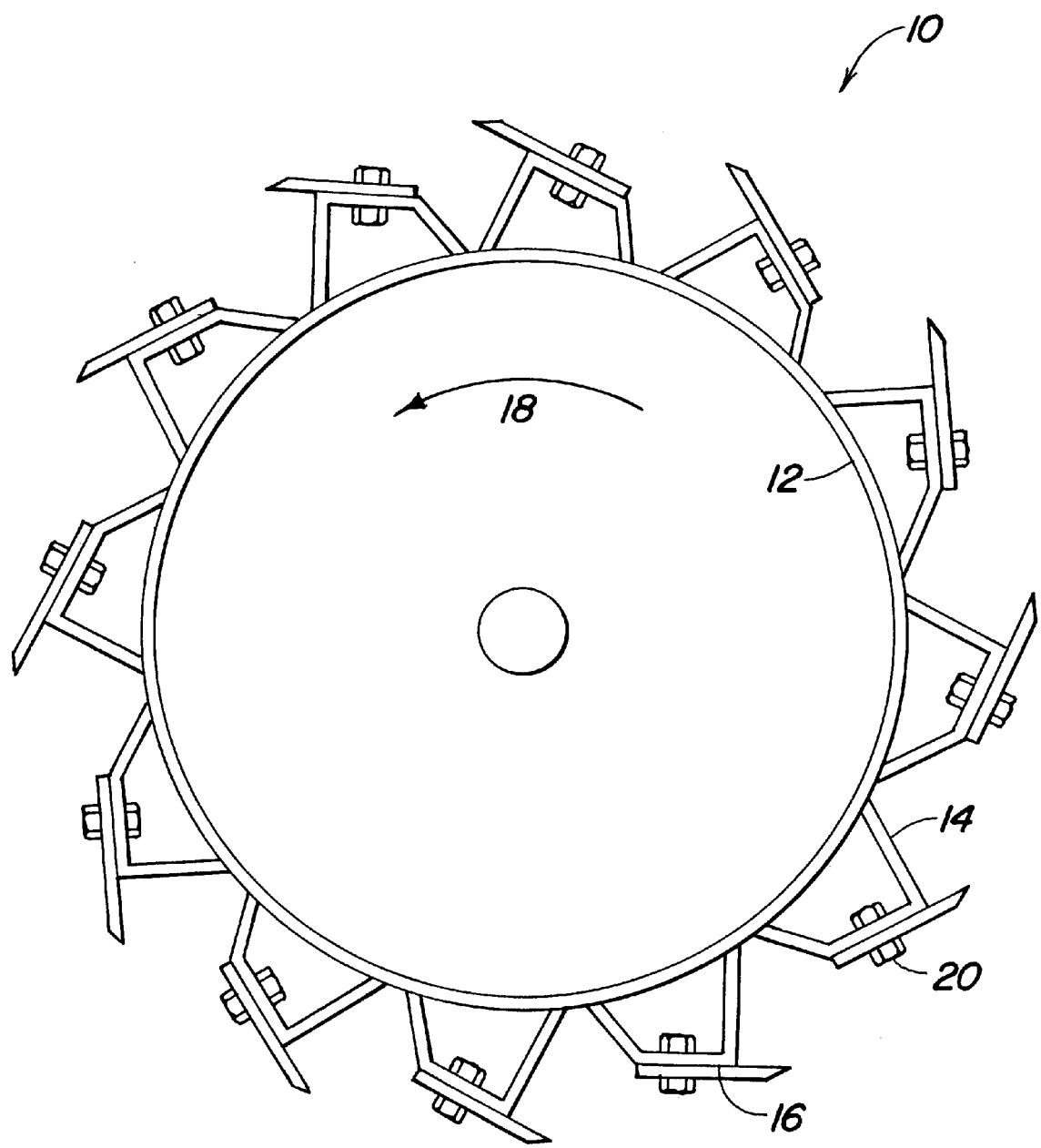
FIG. 1 is a side view of a chopper drum equipped with chopper knives constructed in accordance with the principles of the present invention.

Referring now to FIG. 1, there is shown a chopper drum 10 including a drum body 12, knife supports 14 and chopper knives 16.

The chopper drum 10 can be used, for example, in an agricultural forage harvester, not shown, which harvests corn, grass or other crops and reduces these with the chopper drum 10 in conjunction with a shear bar, not shown. An arrow 18 indicates the direction of rotation of the chopper drum 10 during the chopping process. The drum body 12 forms a closed drum, of circular cross section, to whose end faces stub shafts, not shown, are attached, the stub shafts being supported in bearings so that the drum body 12 rotates freely. In lieu of the drum body 12, other knife support bodies may also be used, for example, bodies having radial ribs or plates over which the chopper knives are arranged in a so-called open configuration.

The knife supports 14 are preferably manufactured from rolled steel sections and are each provided with a leg that is used to support the chopper knife 16 and, that, in any case, extends generally tangential to the drum body 12. The knife supports 14 are welded to the outside of the drum body 12, in particular, evenly distributed in several ring rows. If a knife support of an open configuration is used in lieu of the chopper drum 10 is designed as an open configuration, no knife supports 14 are used, but known retainers are provided for the chopper knives 16. The chopper knives 16 are attached to the knife supports 14 with several fastener elements 20 in the form of screws and can be moved relative to these in order to deflect if hit by foreign objects and can be reset when wear occurs. In the illustrated embodiment, the chopper knives are those that extend only over a part of the width of the chopper drum 10 and whose cutting edge ends in a line that extends parallel to the axis of rotation of the chopper drum 10. However, the invention is not limited to this type of chopper knife 16. Rather, the invention can as well be applied to chopper knives, as described in U.S. Pat. No. 5,544,826, granted Aug. 13, 1996, to Klingler et al., whose disclosure is expressly incorporated herein. The chopper knives disclosed there extend only over a part of the width of the chopper drum 10 and are shaped and bent at angles in their forward region in such a way that their cutter side extends at an inclination to the axis of rotation. In addition, such chopper knives can be configured according to the present invention which extend over the entire, the half or any other fraction of the width of the chopper drum 10, in particular, parallel to the axis of rotation as well as at an angle to it, where they are also curved along their length.

Now, referring to FIGS. 2a through 3d, it can be seen that the chopper knives 16 and 16' differ essentially only in the form of their respective cutting regions 22 and 22'. Specifically, the entire cutting region 22 of the knife 16 is co-planar with the attachment region 24, whereas a major portion of the cutting region 22' of the knife 16' is bent such that it makes an angle of about 10° to the plane of the attachment region 24' of the knife 16'. Both chopper knives 16 and 16' have in common the fact that they are configured in a trapezoidal shape, where the cutting region 22 or 22', in each case, extends over the wider end and the attachment region 24 extends over the narrower end. Each chopper knife 16 and 16' is forged from a steel plate approximately 7 mm. thick and is generally planar. Starting from the narrower end of the attachment region 24 or 24', three openings 26 extend towards the cutting region 22 or 22'. The openings 26 are configured as longitudinal slots whose longitudinal axes extend parallel to each other and perpendicular to the long end edge. The openings 26 extend to a depth of approximately one-half of the distance between the long and short edges of the knife 16 or 16'.

To the extent thus far described, the chopper knives 16 or 16' correspond to those disclosed in the aforementioned U.S. Pat. Nos. 4,061,284 and 4,257,566, and to commercially available chopper knives of like construction.

The chopper knives 16, and 16', according to the invention, differ from the known chopper knives by the cutting regions 22 and 22', respectively, including recesses 28 and 28', which are machined or formed into a leading outer side region, as considered in the direction of rotation, indicated by the arrow in FIG. 1, and from the center of the chopper drum 10, of the chopper knives 16 and 16' and extend up to respective cutting edges 30 and 30'. The recesses 28 or 28' are arranged in close side-by-side relationship to each other substantially over the entire length of the cutting regions 22 or 22'. In the disclosed embodiments, fifteen recesses 28 or 28' extend over almost 90% of the cutting regions 22 or 22', with each recess 28 or 28' being approximately 10 mm. wide and, in cross section, being a circular arc having a radius of from 6 to 14 mm. The cutting regions 22 or 22' are each beveled to form a cutting edge 30 or 30' having a cutting edge angle of approximately 25° to 45° while the recesses 28 or 28' extend parallel to the extent of the general plane of the chopper knives 16 or 16' with the result that the cutting edge 30 or 30' is scalloped or serrated. As disclosed, the length of each recess 28 or 28' corresponds approximately to one-half the distance between the cutting edge 30 or 30' and the inner ends of the openings 26, but the recesses may extend to, or almost to, the openings 26, as indicated for example at 29 in FIG. 2a.

As stated above, the recesses 28 or 28' are machined or formed into the cutting regions 22 or 22'. The machining is in the form of milling, for example. Forming of the regions 22 or 22' could be done by forging or rolling the recesses 28 or 28' into these regions, which leads to increased strength in the cutting region 22 or 22'.

In the embodiment according to FIGS. 3a through 3d, the recesses 28' are machined or formed into the chopper knife 16', and, following this, the cutting region 22' is bent inwardly towards the chopper drum 12 through and angle of about 10° from the principle plane or attaching region 24' of the chopper knife 16'.

By reason of the recesses 28 or 28', sharpening of the cutting region 22 or 22' by grinding does not result in a straightening of the cutting edge 30 or 30' but results in the cutting edge remaining corrugated or serrated after each grinding process. Outside of its central region, the curved shape of the cutting edge 30 leads to a radial component that produces a pulling cut when contact is made with the crop to be chopped. In this way the cutting forces are reduced and the loads on the chopper drum 10 are reduced as well. Stated otherwise, the configuration of the chopper knife 16 or 16' is similar to a scalloped-edge bread knife, which leads to a reduction in the cutting force since free spaces are developed at the cutting region 22 or 22' and thereby the cross section of the knife is reduced. As a result, a smaller amount of knife material needs to be moved through the crop to be cut, which has the effect of lowering the forces required. It is to be noted that the ridges formed at the borders between adjacent recesses 28 or 28' have the effect that the crop which is particularly soft and resilient cannot deflect. Furthermore, the recesses 28 or 28' act as guides for the chopped crop, so that a flow in an undesirable direction is avoided.

We claim:

1. In a chopper knife including a plate having opposite first and second, substantially parallel surfaces and a cutting region including a beveled surface extending from said first surface to a continuous elongate cutting edge at a juncture of said beveled surface with said second surface, the improvement comprising: said cutting region including a plurality of recesses of arcuate transverse cross section located in said second surface and extending generally perpendicular to, and terminating at said cutting edge, whereby said cutting edge is serrated; and said recesses bordering on each other across said second surface so as to define a plurality of ridges between adjacent recesses and extending perpendicular to said cutting edge.

2. The chopper knife defined in claim 1 wherein the cutting edge of said cutting region is formed such as to have an angle of from about 30° to 50° and such that said recesses each have a width of from 5 to 20 mm.

3. The chopper knife defined in claim 1 wherein said recesses are arcuately curved in transverse cross section at a radius of from 6 to 14 mm.

4. The chopper knife defined in claim 1 wherein said cutting region is bent through an angle of approximately 10° from a principle plane of the chopper knife in a direction away from said first surface.

5. The chopper knife defined in claim 1 wherein said recesses occupy at least three-quarters of a width dimension of said chopper knife.

\* \* \* \* \*